United States Patent
Nakamura et al.

(10) Patent No.: US 8,018,683 B2
(45) Date of Patent: Sep. 13, 2011

(54) HEAD SLIDER AND MAGNETIC RECORDING DEVICE THEREWITH

(75) Inventors: Norikazu Nakamura, Kawasaki (JP); Hiroshi Chiba, Kawasaki (JP); Yoshiharu Kasamatsu, Kawasaki (JP); Takayuki Musashi, Kawasaki (JP); Yukiko Oshikubo, Kawasaki (JP); Tsukasa Itani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 854 days.

(21) Appl. No.: 11/986,517

(22) Filed: Nov. 21, 2007

(65) Prior Publication Data

US 2008/0259497 A1 Oct. 23, 2008

Related U.S. Application Data

(62) Division of application No. 11/047,364, filed on Jan. 31, 2005, now Pat. No. 7,317,594.

(30) Foreign Application Priority Data

Aug. 31, 2004 (JP) .................. 2004-251418

(51) Int. Cl.
*G11B 5/60* (2006.01)
*G11B 15/64* (2006.01)
*G11B 17/32* (2006.01)

(52) U.S. Cl. .................................. 360/235.1
(58) Field of Classification Search ........... 360/235.1, 360/234.1, 235.2; 428/814
See application file for complete search history.

(56) References Cited

U.S. PATENT DOCUMENTS

| | | | |
|---|---|---|---|
| 4,863,809 A | 9/1989 | Brar et al. | 428/623 |
| 5,118,577 A | 6/1992 | Brar et al. | 360/235.2 |
| 5,227,196 A * | 7/1993 | Itoh | 427/249.1 |
| 5,280,401 A | 1/1994 | Inomata et al. | 360/97.01 |
| 5,864,452 A * | 1/1999 | Hirano et al. | 360/122 |
| 5,942,317 A | 8/1999 | White | 428/216 |
| 6,197,367 B1 | 3/2001 | Matsuda et al. | 427/127 |
| 6,236,543 B1* | 5/2001 | Han et al. | 360/236.6 |
| 6,400,531 B1* | 6/2002 | Inoue et al. | 360/235.2 |
| 6,793,778 B2* | 9/2004 | Gador et al. | 204/192.11 |
| 2001/0008716 A1 | 7/2001 | Matsuda et al. | 428/827 |
| 2002/0028358 A1 | 3/2002 | Ishibashi et al. | 428/827 |
| 2004/0160691 A1 | 8/2004 | Kubota | 360/16 |
| 2005/0045468 A1* | 3/2005 | Hwang et al. | 204/192.15 |
| 2005/0201012 A1* | 9/2005 | Kasamatsu et al. | 360/235.1 |
| 2006/0209464 A1* | 9/2006 | Kurita et al. | 360/235.1 |

FOREIGN PATENT DOCUMENTS

| | | |
|---|---|---|
| JP | A 1-245425 | 9/1989 |
| JP | 3-025723 | 2/1991 |
| JP | A 9-237415 | 9/1997 |
| JP | A 10-228640 | 8/1998 |
| JP | 2001-344745 | 12/2001 |
| JP | 2002-150529 | 5/2002 |

* cited by examiner

*Primary Examiner* — Julie Anne Watko
(74) *Attorney, Agent, or Firm* — Greer, Burns & Crain, Ltd.

(57) ABSTRACT

A head slider that can furnish excellent head flying stability and a magnetic recording device having excellent head flying stability are provided. For the head slider, the protective layer is composed of two layers, that is, a lower layer and an upper layer thereon; the ionization potential of the lower layer is made to be smaller than that of the upper layer; and the surface free energy of the upper layer is made to be 45 mN/m or less.

11 Claims, 6 Drawing Sheets

HEAD SLIDER AND MAGNETIC RECORDING DEVICE THEREWITH

CROSS-REFERENCE TO RELATED APPLICATIONS

This is a Divisional of application Ser. No. 11/047,364, filed Jan. 31, 2005.

This application is based upon and claims the benefit of priority from the prior Japanese Patent Application No. 2004-251418, filed on Aug. 31, 2004, the entire contents of which are incorporated herein by reference.

BACKGROUND OF THE INVENTION

1. Field of the Invention

The present invention relates to a magnetic recording medium and a head slider.

2. Description of the Related Art

In a magnetic recording device that is generally widely used as an external storing unit for computers and other various information terminals, a head slider equipped with a recording transducer (also simply referred to as "head" in the present invention) reads and writes information, while flying (or floating) over a magnetic recording medium (also simply referred to as "medium" in the present invention) such as a hard disc.

The distance between the head and a magnetic layer that records (writes) and/or reproduces (reads) magnetic information on the hard disk, is called a magnetic spacing. The smaller the magnetic spacing is, the more improved the recording density is. Accordingly, the present level of the head floating gap has become as small as 10 nm or less as a result of a strong need for higher recording density in recent years. In such an ultra-small floating gap, only a small amount of contaminants adhered onto a head slider may make the flying stability (or floating stability) of the head greatly out of balance.

Volatile organic materials, debris, etc. brought about from the environment are examples of such contaminants. As the head slider moves, volatile organic materials, debris, etc. adhered to the hard disk are scraped together and collected on the head slider, and eventually fill in the head floating gap, resulting in head crashing.

Furthermore, it is known that the lubricant is transferred from the surface of the medium to the head slider surface side by means of evaporation from the medium and intermittent contact with the head slider, etc., with the result that a film as thick as the lubricant layer on the medium is formed inevitably on the outermost head slider surface facing the medium (also referred to as "ABS" that is an abbreviation of "air bearing surface").

In a device having a sufficiently wide floating gap, that is, a device with a low recording density, such lubricants adhered to the ABS have been posing little problem. However, as the floating gap has been made very small as in the devices at the present day, such a behavior has come to be on the level that cannot be ignored as a factor for making the flying of the head unstable. It is understood that the instability of the flying is caused by the lubricant on the ABS contacting with the lubricant of the medium, and forming a liquid bridge.

As a method to solve the above-described problem, it is proposed to install a lubricant layer made of a water-repellent resin having an average film thickness of 1.5 nm or less on the surface of a head slider protective layer that faces the magnetic recording medium, so as to decrease the surface tension of the head slider surface (Japanese Patent Application No. 16-156468). It is to be noted that carbon-type materials such as amorphous carbon are considered to be desirable for the head slider protective layer from the viewpoint of heat resistance, corrosion resistance and abrasion resistance, and carbon-type protective layers deposited by the sputtering method and the CVD (Chemical Vapor Deposition) method are used in general.

One distinguished feature of such a method is that the lubricant applied onto the head slider is subjected to a UV (ultraviolet) irradiation treatment so that the lubricant layer is transformed from a liquid-like state in which it is easily deformed and mobilized into a state in which it is hard to be deformed and mobilized, and also it is tightly adhered to the head slider surface. Using this head slider, not only is the adhesion of contaminants decreased, but also it is hard for the liquid bridge to be formed with the lubricant applied to the magnetic recording medium.

It is thought that the effect of the above-described UV ray irradiation is brought about by the progress of chemical bonding between the lubricant and the head slider protective layer which is caused by activated points in the lubricant formed by photoelectrons excited in and emitted from the head slider protective layer.

However, amorphous carbons widely used as materials for the present protective layer, have a low photoelectron emission efficiency, since their ionization potential is as high as about 5.8 eV. Accordingly, a long UV irradiation process is necessary so as to acquire a sufficient force of adhesion. Such long UV irradiation will accelerate the decomposition of the lubricant, causing thinning of the film and deterioration of the adhesion force that is considered to be due to the lowering of the molecular weight, with the result that there occur problems such as deterioration of the adhesion rate of the lubricant to the head slider surface, and degradation of the adhesion uniformity that accompanies the adhesion rate deterioration.

While the above explanation is made on a head slider, similar technologies can be also applied to the lubricant layer on a magnetic recording medium, and therefore, there are similar problems. Although technologies such as one in which an adhesion force reinforcing substance interposed in between is adhered to the protective layer surface, are disclosed regarding the magnetic recording medium protective layer (Japanese Unexamined Patent Application Publication No. 03-25723, for example), they are still insufficient.

It is an object of the present invention to solve such problems and provide a magnetic recording medium and a head slider that can furnish excellent head flying stability, as well as a magnetic recording device having a head with an excellent head flying stability. It is another object of the present invention to provide a method for manufacturing a magnetic recording medium and a head slider that can furnish excellent head flying stability in a short time. Other objects and advantages of the present invention will be clarified through the following explanation.

SUMMARY OF THE INVENTION

According to one aspect of the present invention, provided is a magnetic recording medium formed by layering on a substrate, a magnetic layer, a magnetic recording medium protective layer and a magnetic recording medium lubricant layer in this order, wherein: the magnetic recording medium protective layer is composed of two layers, that is, a lower layer contacting with the magnetic layer and an upper layer on the lower layer; the ionization potential of the lower layer is smaller than that of the upper layer; and the surface free energy of the upper layer is 45 mN/m or less.

Similarly, provided is a head slider having a recoding transducer for recording to and/or reproducing the record from a magnetic recording medium, wherein: a head slider lubricant layer is installed on a head slider protective layer; the head slider protective layer is composed of two layers, that is, a lower layer and an upper layer on the lower layer; the ionization potential of the lower layer is smaller than that of the upper layer; and the surface free energy of the upper layer is 45 mN/m or less.

Regarding each of these aspects, preferable are that the ionization potential of the lower layer is 5.5 eV or less; that the film thickness of the upper layer is not less than 0.5 nm and not more than 1 nm, that the total film thickness of the protective layer is not more than 3 nm; that the materials for the upper and lower layers have a hardness of not less than 15 GPa, respectively; that at least one of the lower layer and the upper layer is formed by deposition by the Filtered Cathodic Arc method; that at least one of the lower layer and the upper layer comprises carbon as a main component; that at least one of the lower layer and the upper layer comprises an amorphous carbon as a main component; that the upper layer comprises at least one element of hydrogen and fluorine; that the lower layer comprises at least one element of nitrogen and oxygen; that the lubricant layer is subjected to an irradiation treatment of active energy rays; and that the lubricant layer is water-repellent.

By these aspects of the present invention, magnetic recording media and head sliders with excellent head flying stability are realized.

According to other aspects of the present invention, provided is a magnetic recording device equipped with the above-described magnetic recording medium, the above-described head slider, or both of them.

By these aspects of the present invention, magnetic recording devices with excellent head flying stability are realized.

According to still another aspect of the present invention, provided is a method for manufacturing a magnetic recording medium formed by layering on a substrate, a magnetic layer, a magnetic recording medium protective layer and a magnetic recording medium lubricant layer in this order, comprising: composing the magnetic recording medium protective layer from two layers, that is, a lower layer contacting with the magnetic layer and an upper layer on the lower layer; and making the ionization potential of the lower layer smaller than that of the upper layer, and the surface free energy of the upper layer 45 mN/m or less.

Also provided is a method for manufacturing a head slider having a recoding transducer for recording to and/or reproducing the record from a magnetic recording medium, comprising: installing a head slider lubricant layer on a head slider protective layer; composing the head slider protective layer from two layers, that is, a lower layer and an upper layer on the lower layer; and making the ionization potential of the lower layer smaller than that of the upper layer, and the surface free energy of the upper layer 45 mN/m or less.

Regarding each of the two aspects, preferable are that the ionization potential of the lower layer is made to be 5.5 eV or less; that the film thickness of the upper layer is made to be not less than 0.5 nm and not more than 1 nm, that the total film thickness of the protective layer is made to be not more than 3 nm; that the materials for the upper and lower layers have a hardness of not less than 15 GPa, respectively; that at least one of the lower layer and the upper layer is formed by deposition by the Filtered Cathodic Arc method; that at least one of the lower layer and the upper layer comprises carbon as a main component; that at least one of the lower layer and the upper layer comprises an amorphous carbon as a main component; that the upper layer comprises at least one element of hydrogen and fluorine; that the lower layer comprises at least one element of nitrogen and oxygen; that the lubricant layer is subjected to an irradiation treatment of active energy rays; and that the lubricant layer is water-repellent.

By these aspects of the present invention, technologies for manufacturing a magnetic recording medium and head slider with excellent head flying stability in a short time are realized.

All in all, magnetic recording media and head sliders with excellent head flying stability, magnetic recording devices with excellent head flying stability can be provided. It is also possible to manufacture magnetic recording media and head sliders with excellent head flying stability in a short time.

DESCRIPTION OF THE PREFERRED EMBODIMENTS

Embodiments according to the present invention will be described with reference to the following figures, tables, equations, examples, etc. It is to be understood that these figures, tables, equations, examples, etc., plus the explanation below are for the purpose of illustrating the present invention, and do not limit the scope of the present invention. It goes without saying that other embodiments should also be included in the category of the present invention as far as they conform to the gist of the present invention. In the figures, the same sign indicates the same element.

In the following, the present invention will be explained mainly on hard disk devices. However, any head slider may be a "head slider" according to the present invention, including one operating with the loading-unloading mechanism, one operating with the contact-start-stop mechanism, one with which information is recorded and reproduced by the complete floating method, one with which information is recorded and reproduced by the gas-liquid mixing method and one with which information is recorded and reproduced by the contact method, besides those for hard disc devices Also, any recording medium may be a "magnetic recording medium" according to the present invention, including a longitudinal recording medium, an SFM (Synthetic Ferrimagnetic Medium or Antiferromagnetically Coupled Medium), a vertical recording medium, and a patterned medium used for hard disk devices. Furthermore, any magnetic recording device using such a head slider and/or magnetic recording medium is included in the "magnetic recording device" according to the present invention.

It is to be noted that a protective layer for a magnetic recording medium is called a magnetic recording medium protective layer or medium protective layer, and a protective layer for a head slider is called a head slider protective layer or head protective layer, in the present invention. When both cases are referred to, the simple term "protective layer" is used.

Also, a lubricant layer for a magnetic recording medium is called a magnetic recording medium lubricant layer or medium lubricant layer, and a lubricant layer for a head slider is called a head slider lubricant layer or head lubricant layer. When both cases are referred to, the simple term "lubricant layer" is used.

In addition, when the terms upper and lower layers are used, a layer that is closer to the outermost layer is called an upper layer, and a layer that is less closer to the outermost layer is called a lower layer, for both of the medium and head slider.

Figure 6:
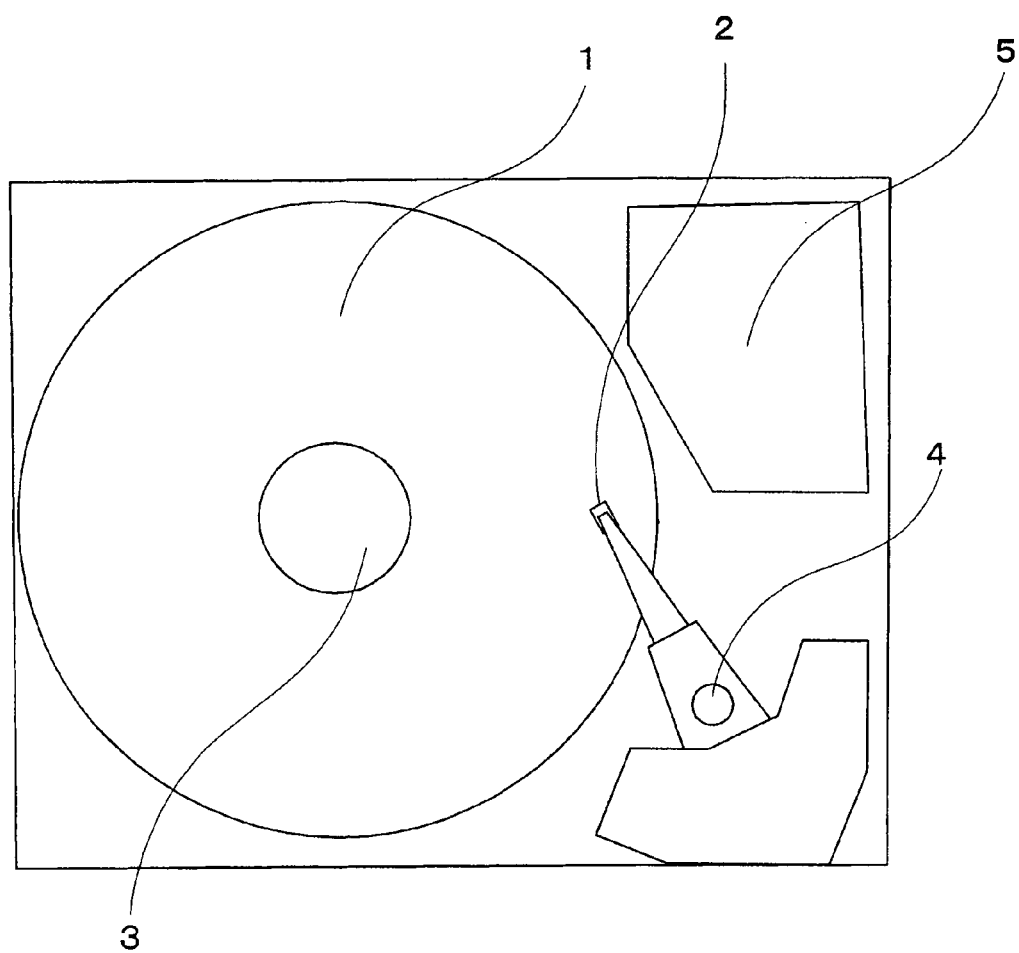
FIG. 6 is a schematic plan view illustrating the internal structure of a hard disc device.
Figure 7:
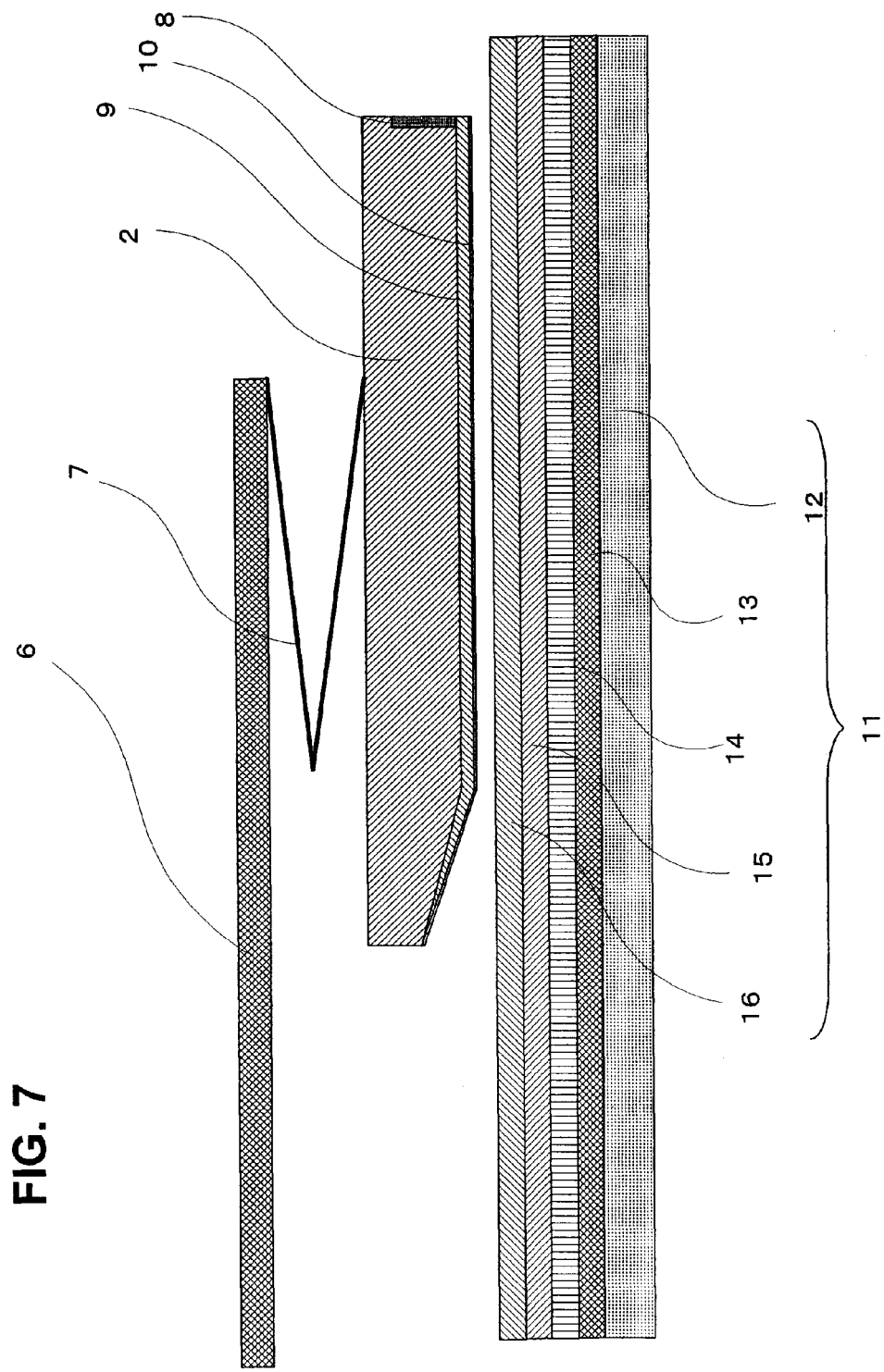
FIG. 7 is a schematic side cross-sectional view illustrating the relationship between a head and a magnetic recording medium.

FIG. 6 is a schematic plan view depicting the internal structure of a hard disk device, and FIG. 7 is a schematic side cross-sectional view (a cross-sectional view cut in a direction perpendicular to the magnetic layer surface of the magnetic recording medium) depicting the relationship between a head and a magnetic recording medium.

This hard disk device comprises, as main components, a magnetic recording medium 1, a head slider 2 that has a head, a rotation control mechanism (e.g. spindle motor) 3 for the magnetic recording medium 1, a positioning mechanism 4 for the head, and a processing circuit (e.g. read/write amplifier) 5 for recording/reproducing signals, as shown in FIG. 6.

As FIG. 7 shows, the head slider 2 is connected with the positioning mechanism 4 for the head by a suspension 6 and gimbals 7 for flexibly supporting the head slider 2, and a head 8 is installed at the tip of the head slider 2. On the head slider surface, a head protective layer 9 and a head lubricant layer 10 are formed.

A magnetic recording medium 11 is comprised of a substrate 12, Cr underlayer 13, magnetic layer 14, medium protective layer 15, medium lubricant layer 16, etc. from the bottom to top in FIG. 7. Other layers including a seed layer may also be installed, but they are not shown in this figure. In the case of a hard disk device, the thickness of the medium lubricant layer is about 1-2 nm, the thickness of the medium protective layer is about 3-5 nm, the thickness of the magnetic layer is about 20 nm, and the thickness of the Cr underlayer is about 10 nm, in general.

In such configurations, the above-described problems can be solved by a magnetic recording medium formed by layering on a substrate, a magnetic layer, a medium protective layer and a medium lubricant layer in this order, wherein: the medium protective layer is composed of two layers, that is, a lower layer contacting with the magnetic layer and an upper layer on the lower layer; the ionization potential of the lower layer is smaller than that of the upper layer; and the surface free energy of the upper layer is 45 mN/m or less, or by a head slider having a recording transducer for recording to and/or reproducing a record from a magnetic recording medium, wherein: a head lubricant layer is installed on a head protective layer; the head protective layer is composed of two layers, that is, a lower layer and an upper layer on the lower layer; the ionization potential of the lower layer is smaller than that of the upper layer; and the surface free energy of the upper layer is 45 mN/m or less.

In general, by lowering its ionization potential, the photoelectron emission efficiency of a protective layer is increased, with the result that the adhesion rate of a lubricant and the protective layer can be improved, while greatly cutting down the irradiation duration of active energy rays such as UV rays.

In order to decrease the ionization potential, it is efficient and easy to dope oxygen or nitrogen into the protective layer.

However, if the surface free energy increases when the ionization potential is made smaller, the problem of contaminants tending to be easily adsorbed occurs. Such increase of surface free energy becomes conspicuous, when oxygen or nitrogen is doped into the protective layer as a means to decrease the ionization potential.

On the other hand, when the surface free energy of the protective layer is made smaller, the problem of the ionization potential tending to be increased, would come about. For example, while it is effective to dope at least one element of fluorine and hydrogen into the protective layer so as to decrease the surface free energy of the protective layer, the ionization potential is generally increased in such a protective layer, with the result that the photoelectron emission efficiency is decreased.

Such a problem can be avoided by making the ionization potential of the lower layer smaller than that of the upper layer, and making the surface free energy of the upper layer 45 mN/m or less, at the same time.

In this case, a sufficient amount of photoelectrons are generated by active energy rays such as UV rays that pass through the upper layer and reach the lower layer, with the result that the adhesion rate between the lubricant and the protective layer is increased, and the adsorption of the contaminants can be prevented by making the surface free energy of the upper layer 45 mN/m or less.

Therefore, it is possible to obtain a magnetic recording medium and a head slider that can furnish excellent head flying stability by applying the present invention. It is also possible to manufacture such a magnetic recording medium and a head slider as those described above that can furnish excellent head flying stability in a short time, by raising the photoelectron emission efficiency.

To make the surface free energy of the upper layer 45 mN/m or less, it is preferable that the upper layer comprises at least one element of hydrogen and fluorine. There is no particular limitation to the contents of fluorine and hydrogen. It is preferable to have elements such as metals, nitrogen, oxygen as little as possible in the upper layer, especially in the area close to the surface of the upper layer, since they tend to adsorb contaminants.

In addition, it is preferable that the lower layer comprises at least one element of nitrogen and oxygen, so as to make the ionization potential of the lower layer smaller than that of the upper layer. In this case, fluorine and hydrogen may also be present as long as it is not against the gist of the present invention. Although there is no particular limitation to the contents of nitrogen and oxygen, it is preferable that the ionization potential of the lower layer is 5.5 eV or less. When it exceeds 5.5 eV, there are cases in which the amount of generated photoelectrons is insufficient.

It is preferable that the film thickness of the upper layer is not less than 0.5 nm and not more than 1 nm. If it is less than this range, there would be a possibility that formation of a uniform film as the upper layer becomes difficult, with the result that the lower layer is partly exposed and tends to adsorb contaminants. When it exceeds this range, the probability of photoelectrons being deactivated before activated points are formed in the lubricant becomes larger, since the film thickness of the upper layer becomes comparable to the average free path of the photoelectrons generated in the lower layer. It is to be noted that it is preferable that the total film thickness of the protective layer is not more than 3 nm, so as to decrease the magnetic spacing.

In addition, it is preferable that the materials for the upper and lower layers have a hardness of not less than 15 GPa, respectively. Values less than the value tend to cause trouble to the primary object of the protective layer, that is, to prevent the head and the magnetic layer of the medium from being mechanically damaged.

The upper and lower layers are not necessarily clearly discernable from each other, physically or compositionally. It is sufficient if the above-described relationship holds when an upper layer part and a lower layer part of a protective layer are compared. A concentration gradient may exist. To be specific, a protective layer according to the present invention may be obtained, by using one the same amorphous carbon as the main components for both the upper and lower layers, doping at least one element of nitrogen and oxygen when the lower layer is formed, followed by preparation of the upper layer in which supply of these elements is ceased and then at least one element of fluorine and hydrogen is doped. It is not always necessary to start supplying the fluorine and/or hydrogen after the nitrogen and/or oxygen is completely removed from the system, or a state in which they are present at the same time, may be allowed.

Such a combination of upper and lower layers can be easily selected by actually forming them as single layers, and measuring the ionization potential and the surface free energy.

To form a protective layer comprising upper and lower layers according to the present invention, there is a method, to be specific, in which the Filtered Cathodic Arc method (the FCA method) is employed, for example, and when the lower layer is formed, doping is performed by ion assisting, using an ion gun or the like so as to have nitrogen or oxygen also present in the lower layer, and when the upper layer is formed, doping is performed by ion assisting, using an ion gun or the like so as to have fluorine or hydrogen also present in the upper layer. A nitrogen gas can be used as a raw material for doping with nitrogen, an oxygen gas can be used as a raw material for doping with oxygen, a hydrogen gas can be used as a raw material for doping with hydrogen, and tetrafluoromethane can be used as a raw material for doping with fluorine.

Besides the FCA method, sputtering and the CVD method may be applied to form a protective layer comprising an upper layer and lower layer according to the present invention.

Any material may be used as a component for the composition of the upper layer or lower layer. It is preferable to use a carbon, particularly an amorphous carbon as a main component. As other components for the composition, $TiO_2$, $Cr_2O_3$, CrN, WC, TiC, ZrC, Si, SiC, $Al_2O_3$, BN, SiN, etc. are examples. As materials for the head slider, $Al_2O_3$—TiC, silicon, sapphire, etc. are examples.

Any method can be applied besides the above-described FCA method for obtaining a layer composed of a carbon such as an amorphous carbon. It is to be noted that "comprising as a main component" according to the present invention means that the component exceeds 50 atom %. For the composition of the upper layer, it is more preferable that not less than 90 atom % is a carbon.

It is to be noted that the film hardness can be raised by compacting the composition, for example, by having more $sp^3$ carbon structure. From this viewpoint, it is preferable for the upper layer to have a density not less than 2.5 g/cm$^3$. An amorphous carbon is particularly preferable.

Figure 3:
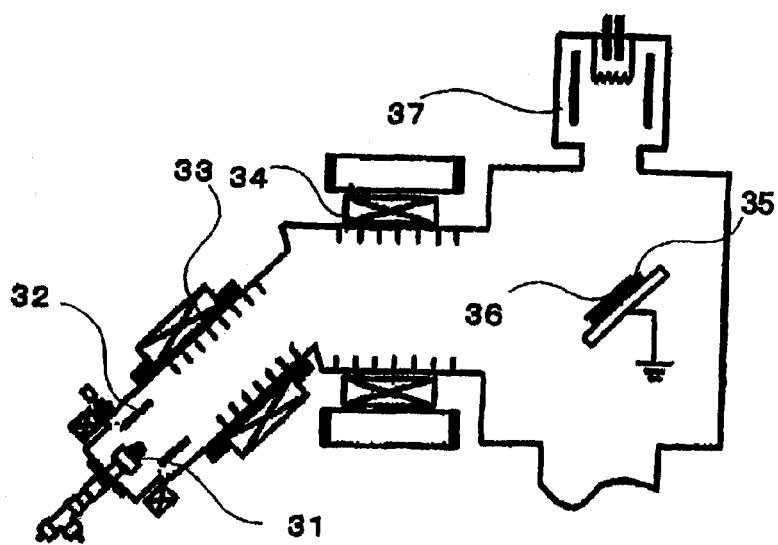
FIG. 3 is a schematic view illustrating the structure of an FCA device.

An amorphous carbon can be prepared by the FCA method as follows. FIG. 3 is a schematic view of a FCA deposition system to perform the FCA method. In reference to FIG. 3, a carbon source such as graphite is used as a cathode 31. Arc discharging is caused between the cathode 31 and an anode 32 to generate carbon ions, electrons, carbon neural atoms and carbon macroparticles, from which the carbon neutral atoms and carbon macroparticles are removed by magnetic filters (filter coils 33 and 34) so that only the carbon ions and electrons are sent to a substrate 35. Thus, a DLC (diamond-like carbon) layer 36 is formed on the substrate. An ion gun 37 can be used for doping with other elements.

With the FCA method, it is easy, based on the deposition principle, to increase the amount of $sp^3$ bonding that is generally called diamond bonding, to 50% or more of the total bonding. Accordingly, it is possible to realize a hardness and density similar to those of diamond in an amorphous form.

It is important to subject the lubricant layer formed on the protective layer according to the present invention to an irradiation treatment with active energy rays. The chemical bonding between the lubricant and the protective layer progresses by formation of activated points in the lubricant caused by photoelectrons excited in and emitted from the protective layer by means of active energy ray irradiation.

Any known active energy rays may be used for this purpose as long as it is not against the gist of the present invention. UV rays, excimer rays, X-rays, electron beams, focused ion beams, etc. can be used. Xenon excimer rays and electron beams are particularly preferable. Irradiation time can be determined appropriately. When the irradiation treatment with active energy rays is performed, it is possible to change the state of the lubricant layer from a liquid-like state in which the layer is easily deformed and mobile to a state in which the layer is hard to be deformed and hard to move, and also to firmly adhere the layer to the surface of the protective layer. It is possible to confirm that the layer is firmly adhered to the surface of the protective layer, by evaluating the film thickness of the lubricant layer after the washing of the lubricant on the surface of the protective layer with a solvent.

Any material may be used for the lubricant layer according to the present invention, as long as it does not contradict the gist of the present invention. Those containing a fluororesin are preferable. As a fluororesin for the purpose, fluorinated hydrocarbons that may be branched, fluorinated polyethers that may be branched, or mixtures thereof can be enumerated. Perfluorinated hydrocarbons that may be branched, perfluoropolyethers that may be branched, or mixtures thereof are more preferable. The more the fluorine content in a molecule is, the less the coagulation properties are, and accordingly, it is possible to form a uniform layer with a small surface tension. Regarding the fluorine content, the ratio of the mole number of fluorine to the total mole number of fluorine and hydrogen in a molecule is preferably not less than 80%, more preferably not less than 90%, and still more preferably not less than 95%. It is to be noted that the weight-average molecular weight of the resin is preferably in the range of from 2,000 to 20,000.

The lubricant layer preferably contains not less than 95 wt. % of a fluororesin. More preferably, it substantially consists of a fluororesin except minor components such as a catalyst.

By the above-described present invention, it is possible to realize a medium and head slider wherein not only the amount of adhered contaminants is reduced but also liquid-bridging between the medium and head slider is hard to occur. Accordingly, a magnetic recording medium and head slider that can furnish excellent head flying stability, are realized. It is also possible to manufacture such a medium and head slider in a short time.

Furthermore, using a magnetic recording device employing at least one of such a medium and head slider, head crashing is hard to occur, and the reliability is improved.

Accordingly, it is possible to realize a magnetic recording device having an excellent head flying stability.

EXAMPLES

Next, examples according to the present invention will be described in detail. It is to be noted that the physical properties were determined as follows.

(Fluorine Content and Nitrogen Content)

The fluorine content and nitrogen content were quantitatively determined using the X-ray photoelectron spectroscopy (XPS).

(Film Hardness)

The nanoindentation method was used for determining the film hardness. The nanoindentation method is a method in which a diamond indenter is pressed into a material by means of a tiny amount of load on the order of a $\mu N$ so that mechanical properties are evaluated by measuring a tiny deformation under the unloading. Since the pressed-in amount can be limited to several nm, it is suitable for evaluating properties of thin film samples.

(Surface Free Energy of a Film)

Surface free energy was determined by measuring the contact angles of pure water and diiodomethane on a film object, followed by the calculation using the following equations.

When $\gamma_S$ is a surface free energy of a solid sample, $\gamma_L$ is a surface free energy of a liquid sample, $\theta_{SL}$ is a contact angle of a solid sample/liquid sample, and $\gamma_{SL}$ is an interfacial free energy of a solid sample/liquid sample, then the Young's equation as shown in equation (1) holds.

$$\gamma_S = \gamma_L \cdot \cos\theta_{SL} + \gamma_{SL} \quad (1)$$

On the other hand, the adhesion work $W_{SL}$, or an energy for the stabilization by adherence of a liquid to the surface of a solid, follows the Dupre equation (2).

$$\gamma_S + \gamma_L = W_{SL} + \gamma_{SL} \quad (2)$$

The Young-Dupre equation (3) is derived from the two equations, and accordingly, the adhesion work can be obtained from the surface free energy and a contact angle of a liquid.

$$W_{SL} = \gamma_L(1 + \cos\theta_{SL}) \quad (3)$$

Equation (4) holds when the geometric mean rule for each surface free energy component is applied to the adhesion work.

$$W_{SL} = 2\sqrt{(\gamma_S^d \cdot \gamma_L^d)} + 2\sqrt{(\gamma_S^h \cdot \gamma_L^h)} \quad (4)$$

Here, d and h are a dispersion component and a hydrogen bonding component, respectively.

The following relationship holds regarding the adhesion work when two different liquids (i,j) are used.

$$\begin{pmatrix} W_{SL}^i \\ W_{SL}^j \end{pmatrix} = 2 \begin{pmatrix} \sqrt{\gamma_L^{d,i}} & \sqrt{\gamma_L^{h,i}} \\ \sqrt{\gamma_L^{d,j}} & \sqrt{\gamma_L^{h,j}} \end{pmatrix} \begin{pmatrix} \sqrt{\gamma_S^d} \\ \sqrt{\gamma_S^h} \end{pmatrix} \quad (5)$$

Accordingly, if the adhesion work is determined through actually measuring contact angles for two different liquids, the surface free energy of a solid can be obtained for each component by the following relationship. This relationship is called the Fowkes equation. Furthermore, the surface free energy: $\gamma = \gamma^d + \gamma^h$ can be obtained from the relationship.

$$\begin{pmatrix} \sqrt{\gamma_S^d} \\ \sqrt{\gamma_S^h} \end{pmatrix} = \frac{1}{2} \begin{pmatrix} \sqrt{\gamma_L^{d,i}} & \sqrt{\gamma_L^{h,i}} \\ \sqrt{\gamma_L^{d,j}} & \sqrt{\gamma_L^{h,j}} \end{pmatrix}^{-1} \begin{pmatrix} W_{SL}^i \\ W_{SL}^j \end{pmatrix} \quad (6)$$

(Ionization Potential)

Ionization potential was determined by UPS (Ultraviolet Photoelectron Spectroscopy).

(Amount of Adsorbed Water)

Amount of adsorbed water was determined as a degasification intensity of water by the TDS (Thermal Desorption Method). This is a method in which water that is released while a sample is being warmed up, is evaluated by the intensity data of a mass spectrometer.

(Amount of Adsorbed DOP)

The amount of DOP adsorbed during exposure testing was determined by GC/MS (Gas Chromatograph/Mass Spectrometer).

(Rate of Adhered Lubricant)

Samples were rinsed with 2,3-dihydrodecafluoropentane. The rate of adhered lubricant was determined as the percentage rate of the film thickness of a lubricant layer after the rinsing to that before the rinsing. The film thickness was measured by XPS.

Example 1

An amorphous carbon protective layer having a film thickness of 30 nm was deposited on a head slider substrate made of $Al_2O_3$—TiC, as a head protective layer. Using an FCA apparatus as shown in FIG. 3 and a graphite target as a raw material, the amorphous carbon protective layer was deposited at a deposition speed of 0.1 nm/second, under the conditions: 60 A for the arc current; 30 V for the arc voltage; and 10 A for the current of the cathode coil. During the deposition, a nitrogen gas was supplied to the deposition chamber to perform doping with nitrogen during the deposition in the atmosphere. The film properties of a single film formed by these conditions are indicated in TABLE 1.

TABLE 1

| CONTENT OF NITROGEN (atom %) | FILM HARDNESS (GPa) | IONIZATION POTENTIAL (eV) | SURFACE FREE ENERGY (mN/m) |
|---|---|---|---|
| 10 | 19 | 5.5 | 63 |

Example 2

An amorphous carbon protective layer having a film thickness of 30 nm was deposited on a head slider substrate made of $Al_2O_3$—TiC, as a head protective layer. The head protective layer was prepared in the same way as for EXAMPLE 1, except that tetrafluoromethane ($CF_4$) was supplied instead of a nitrogen gas. The film properties of a single film formed by these conditions are indicated in TABLE 2.

TABLE 2

| CONTENT OF FLUORINE (atom %) | FILM HARDNESS (GPa) | IONIZATION POTENTIAL (eV) | SURFACE FREE ENERGY (mN/m) |
|---|---|---|---|
| 13 | 25 | 6.1 | 45 |

Example 3

An amorphous carbon protective layer having a film thickness of 30 nm was deposited on a head slider substrate made of $Al_2O_3$—TiC, as a head protective layer. The head protective layer was prepared in the same way as for EXAMPLE 1, except that no atmospheric gas was supplied. The film properties of a single film formed by these conditions are indicated in TABLE 3.

TABLE 3

| FILM HARDNESS (GPa) | IONIZATION POTENTIAL (eV) | SURFACE FREE ENERGY (mN/m) |
|---|---|---|
| 30 | 5.8 | 53 |

Example 4

An amorphous carbon protective layer was deposited on a head slider substrate made of $Al_2O_3$—TiC, as a head protective layer. Three type of samples were prepared: sample A on which a 3 nm thick head protective layer was formed in the same way as for EXAMPLE 1; sample B on which a 3 nm thick head protective layer was formed in the same way as for EXAMPLE 2; and sample C on which a 3 nm thick head protective layer was formed in the same way as for EXAMPLE 3.

Figure 2:
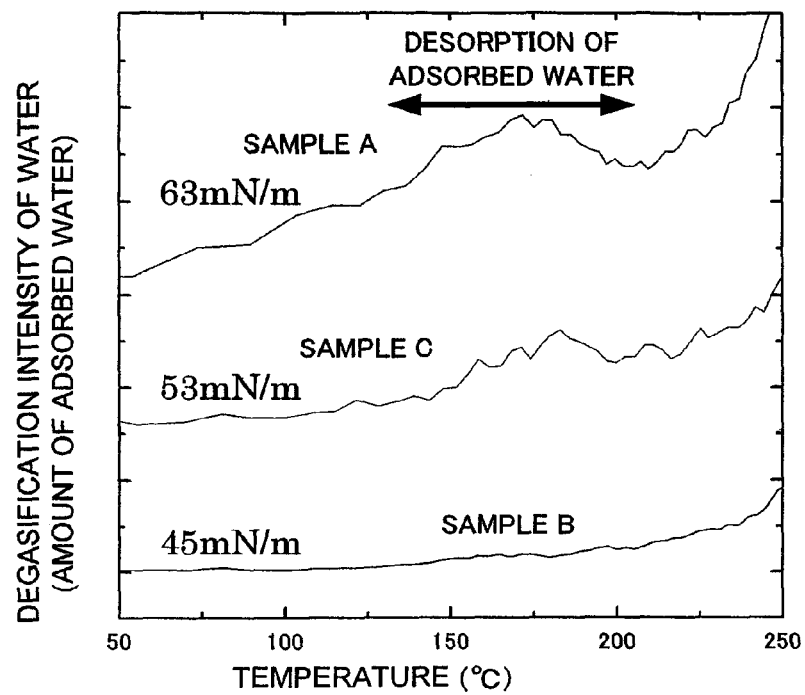
FIG. 2 is a chart showing the result of the observation of the adsorbed water by the TDS.

As a result of observation by the TDS of the amounts of adsorbed water of these samples that is to cause corrosion of the magnetic layer, it was found as shown in FIG. 2 that the smaller the surface free energy, the less the amount of adsorbed water.

Next, using DOP (dioctyl phosphate) that is contained in a plasticizer for plastics as an indicator material of contaminants on the medium and head slider, the amount of adhered DOP was investigated.

Figure 1:
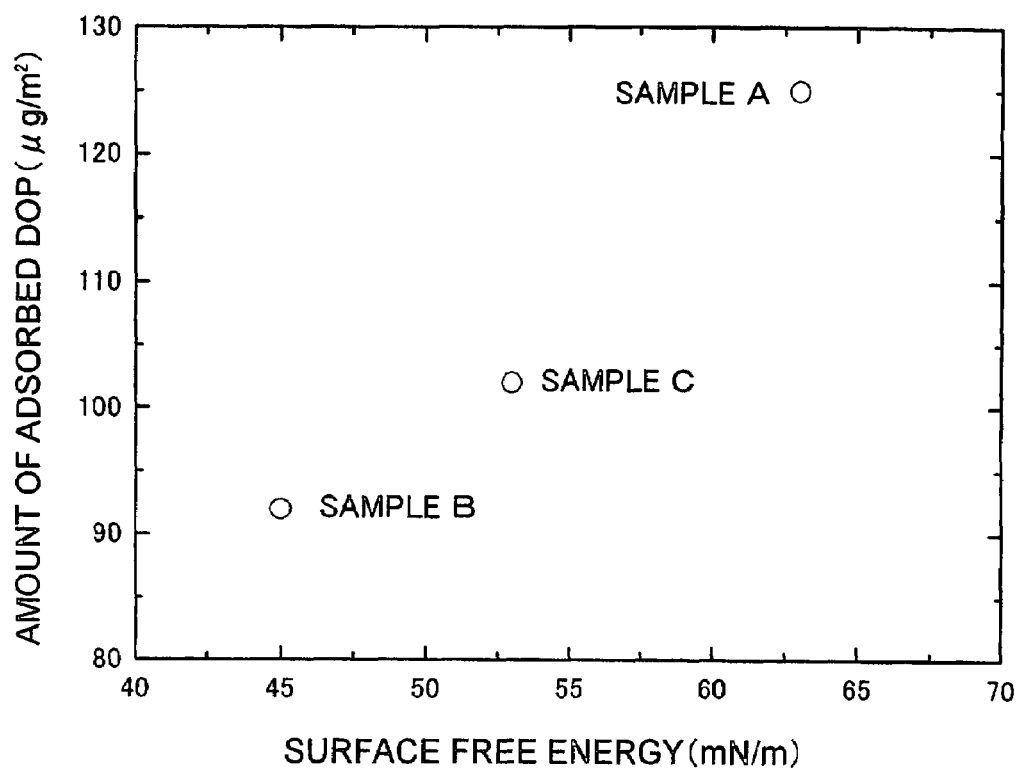
FIG. 1 is a graph showing the relationship between the adsorption amount of DOP and the surface free energy.

To be specific, all samples and DOP were placed in the same deccicator, and the samples were exposed to the DOP vapor for 24 hours. Then, the amount of adsobed DOP on each sample was determined using GC/MS. The result is shown in FIG. 1. The amount of adsobed DOP indicated the same tendency as the amount of adsorbed water, that is, the smaller the surface free energy, the less the amount of adhered DOP water.

Figure 4:
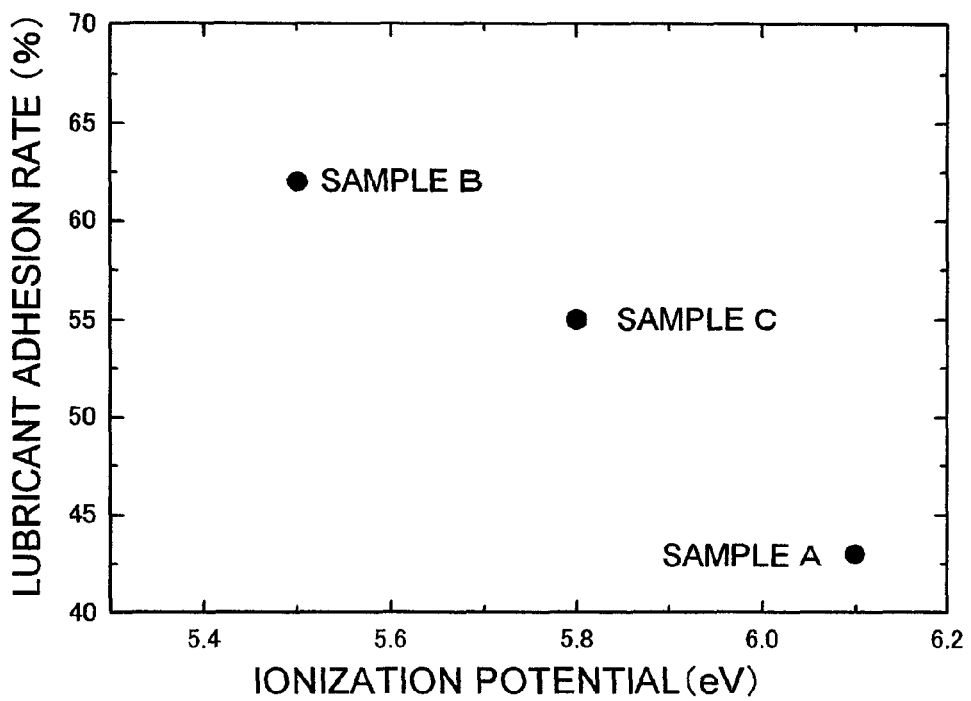
FIG. 4 is a graph showing the relationship between the lubricant adhesion rate and the ionization potential.

Furthermore, in order to investigate the rate of adhesion of a lubricant on each sample, perfluoropolyether (both molecular terminals being trifluoromethy groups and the average molecular weight being 9,500) was applied to form a film having an average film thickness of 1 nm, a xenone excimer light (wave length being 172 nm) was irradiated in a nitrogen atmosphere for 30 seconds, and then, the rates of adhered lubricant were determined from the change in the film thickness of the lubricant before and after the rinsing of the head lubricant layer with 2,3-dihydrodecafluoropentane. As shown in FIG. 4, the adhesion of the lubricant was improved. This is because the rate of efficiency in the generation of photoelectrons is increased as the ionization potential is made smaller.

Example 5

An amorphous carbon protective layer having a film thickness of 3 nm was deposited on a head slider made of $Al_2O_3$—TiC, as a head protective layer.

The amorphous carbon protective layer was formed by forming a 2 nm thick lower layer in the same way as for EXAMPLE 1, and forming a 1 nm thick upper layer in the same way as for EXAMPLE 2, thus making the total thickness 3 nm.

Figure 5:
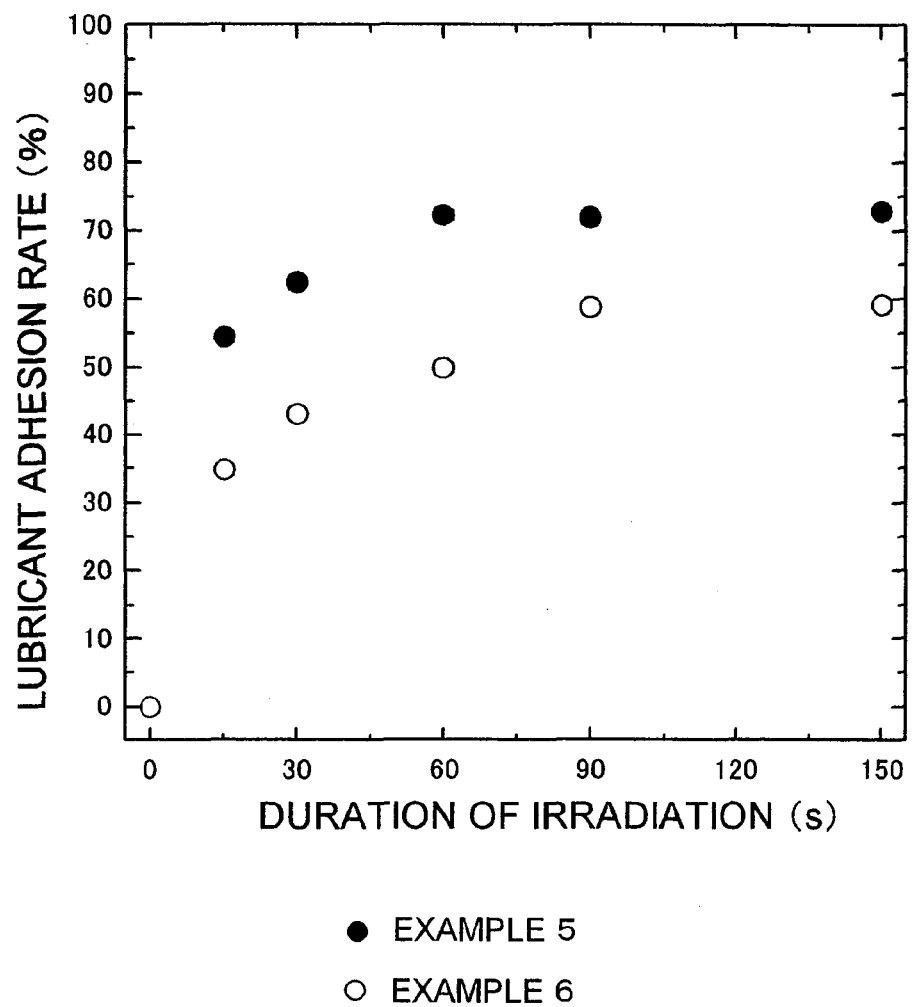
FIG. 5 is a graph showing the relationship between the lubricant adhesion rate and the duration of irradiation with active energy rays.

After that, perfluoropolyether (both molecular terminals being trifluoromethy groups and the average molecular weight being 9,500) was applied onto the surface of the head slider to form a film having an average film thickness of 1 nm, and a xenone excimer light (wave length being 172 nm) was irradiated in a nitrogen atmosphere. FIG. 5 indicates the change in the rate of adhered lubricant according to the irradiation time. The adhesion rate was 55% at an irradiation time of 15 seconds, and it reached 70% or higher in 60 seconds.

Example 6

An amorphous carbon protective layer having a film thickness of 3 nm was deposited on a head slider made of $Al_2O_3$—TiC, as a head protective layer, as in EXAMPLE 5. The amorphous carbon protective layer having a thickness of 3 nm was formed in the same way as for EXAMPLE 3.

After that, perfluoropolyether (both molecular terminals being trifluoromethy groups and the average molecular weight being 9,500) was applied onto the surface of the head slider to form a film having an average film thickness of 1 nm, and a xenone excimer light (wave length being 172 nm) was irradiated in a nitrogen atmosphere. FIG. 5 indicates the change in the rate of adhered lubricant according to the irradiation time. Ninety seconds was needed for the irradiation to reach an adhesion rate of 55%, and no increase of the adhesion rate was observed even though the irradiation was continued after that.

What is claimed is:

1. A head slider having a recording transducer for recording to and/or reproducing a record from a magnetic recording medium, wherein:
    a head slider lubricant layer is installed on a head slider protective layer;
    said head slider protective layer consists of two layers, that is, a lower layer and an upper layer on the lower layer;
    an ionization potential of said lower layer is smaller than that of said upper layer; and
    surface free energy of said upper layer is 45 mN/m or less.

2. A head slider according to claim 1, wherein the ionization potential of said lower layer is 5.5 eV or less.

3. A head slider according to claim 1, wherein a film thickness of said upper layer is not less than 0.5 nm and not more than 1 nm.

4. A head slider according to claim 1, wherein a total film thickness of said head slider protective layer is not more than 3 nm.

5. A head slider according to claim 1, wherein materials for said upper and lower layers have a hardness of not less than 15 GPa, respectively.

6. A head slider according to claim 1, wherein at least one of said lower layer and said upper layer is formed by deposition by a Filtered Cathodic Arc method.

7. A head slider according to claim 1, wherein at least one of said lower layer and said upper layer comprises carbon as a main component.

8. A head slider according to claim 1, wherein at least one of said lower layer and said upper layer comprises an amorphous carbon as a main component.

9. A head slider according to claim 1, wherein said upper layer comprises at least one element of hydrogen and fluorine.

10. A head slider according to claim 1, wherein said lower layer comprises at least one element of nitrogen and oxygen.

11. A magnetic recording device equipped with a head slider according to one of claims 1 to 10.

* * * * *